United States Patent Office 3,092,651
Patented June 4, 1963

3,092,651
2-HYDROXYALKANE PHOSPHONATE AND POLY-PHOSPHONATE HYDROXYALKYL ESTERS
Lester Friedman, Beachwood Village, Ohio, assignor to Weston Chemical Corporation, Newark, N.J., a corporation of New Jersey
No Drawing. Filed Apr. 11, 1962, Ser. No. 186,662
32 Claims. (Cl. 260—461)

This application is a continuation-in-part of application Serial No. 145,749 filed October 17, 1961.

The present invention relates to the preparation of phosphonates.

It is an object of the present invention to prepare novel phosphonates.

Another object is to prepare phosphonates which can be converted to dye receptive polyurethanes.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing phosphonates having the formula

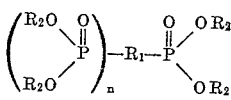

wherein $R_1$ is selected from the group consisting of hydrocarbon, hydroxyalkyl, hydroxyalkoxyalkyl, hydroxypolyalkoxyalkyl, alkoxyalkyl, alkoxyalkoxyalkyl and alkoxypolyalkoxyalkyl and $R_2$ is selected from the group consisting of hydroxyalkyl, hydroxyalkoxyalkyl, hydroxypolyalkoxyalkyl, alkoxyalkyl, alkoxyalkoxyalkyl and alkoxypolyalkoxyalkyl, $n$ is selected from the group consisting of 0 and 1 when $R_1$ is hydrocarbon and $n$ is 0 when $R_1$ is other than hydrocarbon and polymers of said phosphonates. Preferably the alkyl, alkoxy and polyalkoxy groups are lower alkyl, lower alkoxy and lower polyalkoxy group. The polymers prepared according to the invention usually have 2 to 4 phosphorus atoms in the molecule.

Another class of phosphonates within the present invention are the phosphonates formed by the Arbuzov rearrangement of alkane ether polyol phosphites having 3 to 6 hydroxyl groups, said alkane ether polyol being the ether of an alkane polyol having 3 to 6 carbon atoms and 3 to 6 hydroxyl groups with a member of the group consisting of alkylene glycols and polyalkylene glycols.

Another class of phosphonates within the invention are the phosphonates formed by the Arbuzov rearrangement or aromatic hydrocarbon ether polyol phosphites having 3 to 6 hydroxyl groups, said aromatic ether polyols being the ether of a hydroxy aromatic hydrocarbon having 2 to 3 phenolic groups with a member of the group consisting of alkylene glycols and polyalkylene glycols.

The compounds prepared according to the present invention which have free hydroxyl group are particularly valuable for reaction with polyisocyanates, e.g., toluene diisocyanate to form foamed polyurethanes or polyurethane elastomers which are flame resistant and have outstanding dyeing properties. The phosphonates of the present invention are useful as antistatic agents for polyethylene and polypropylene and as dye acceptors when incorporated into polyurethane, polyethylene, epoxy or polypropylene resins. The free hydroxyl containing phosphonates are valuable in the preparation not only of flame resistant polyurethanes but also can be used to form flame resistant polyesters by reacting with polybasic acids, e.g., terephthalic acid, phthalic acid and adipic acid. Such polyesters can be employed as protective coatings for wood, metal or the like. The polyurethanes can be used as linings for textiles, e.g., coats, suits and dresses, insulation in building construction, carpet underlays, threads, cups and protective coatings for steel, wood and glass.

The phosphonates of the present invention also are suitable as flame-proofing agents for cellulose and cellulose esters and the hydroxyl containing phosphonates can be employed as reactants in epoxy resin formulations.

The phosphonates of the present invention can be made by various procedures as illustrated in the examples below. A preferred procedure is to rearrange the corresponding phosphite by an Arbuzov reaction. Thus if a tris polyalkylene glycol phosphite is treated with catalytic amounts of alkyl chloride or bromide at elevated temperature, e.g., 5 mol percent of n-butyl bromide, there is obtained a bis polyalkylene glycol ester of a hydroxyalkaneether phosphonic acid. If the same reaction is carried out with an excess of the alkyl chloride or bromide the product obtained is a bis polyalkylene glycol ester of an alkane phosphonic acid.

The general equations for the two types of reactions are as follows:

I

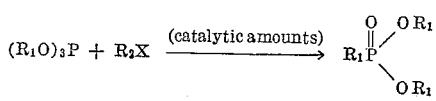

II

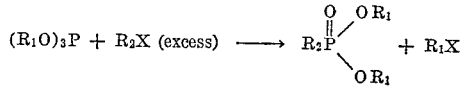

In Equations I and II $R_1$ is a polyalkylene glycol residue from which one hydroxyl hydrogen has been removed, $R_2$ is a polyalkylene glycol residue from which one hydroxyl hydrogen has been removed, $R_2$ is a hydrocarbon or hydroxyhydrocarbon group and X is chlorine or bromine. Reaction I is also called herein the Arbuzov rearrangement.

Examples of compounds within the present invention are bis dipropylene glycol ester of hydroxypropoxypropane phosphonic acid (the phosphonate isomeric with tris dipropylene glycol phosphite) bis tripropylene glycol ester of hydroxydipropoxypropane phosphonic acid, bis polypropylene glycol 2025 ester of hydroxypolypropoxypropane phosphonic acid (wherein the hydroxy polypropoxypropane group has a molecular weight of about 2025), bis dipropylene glycol ester of 2-hydroxypropane phosphonic acid, bis diethylene glycol ester of hydroxyethoxyethane phosphonic acid, bis polyethylene glycol 2000 ester of hydroxypolyethoxyethane phosphonic acid (wherein the hydroxy polyethoxyethane group has a molecular weight of about 2000), bis dibutylene glycol hydroxybutoxybutane phosphonate, bis dipropylene glycol ester of 2-hydroxyethane phosphonic acid, bis dipolyalkylene glycol ester of hydroxypolyalkoxyalkane phosphonic acid (made by Arbuzov rearranging the tris polyalkylene glycol phosphite prepared by transesterifying triphenyl phosphite with a polyalkylene glycol having a molecular weight of about 1000, said polyalkylene glycol having been prepared from a mixture of 90% of propylene oxide and 10% ethylene oxide), bis dipolyalkylene glycol ester of hydroxypolyalkoxyalkane phosphonic acid (made by Arbuzov rearranging the tris polyalkylene glycol phosphite prepared by transesterifying triphenyl phosphite with a polyalkylene glycol which is a block copolymer of polyoxypropylene glycol 1620 molecular weight +17.4% ethylene oxide), bis polypropylene glycol molecular weight 425 ester of hydroxypolypropoxypropane phosphonic acid (the hydroxypolypropoxypropane group having a molecular weight of 425), bis dipropylene glycol methane phosphonate, bis dipropylene glycol butane phosphonate, bis dipropylene glycol octadecane phosphonate, bis dipropylene glycol cyclohexane phosphonate, bis dipropylene glycol benzene phosphonate, bis propylene glycol decane phosphonate, bis dipropylene glycol ester of 4-chlorobenzenephosphonic acid, tetra 2¹-hydroxypropyl ethane-1,2-diphosphonate, tetra 2¹-hydroxypropoxyethane-1,2-diphosphonate, bis diethylene glycol ester of butanephosphonic acid, bis ethylene glycol ester of methanephosphonic acid, bis tripropylene glycol ester of pentanephosphonic acid, bis dibutylene glycol ester of ethanephosphonic acid, bis methoxypropyl ester of methoxypropane phosphonic acid, bis butoxypropoxypropyl ester of butoxypropoxypropane phosphonic acid, bis ethoxypolypropoxypropyl ester of ethoxypolypropoxypropane phosphonic acid (where the polypropoxy groups have a molecular weight of about 2000), bis methoxyethoxyethyl ester of butoxypropoxypropane phosphonic acid, bis dipropylene glycol ester of allyl phosphonic acid, bis diethylene glycol ester of methallyl phosphonic acid, bis dipropylene glycol ester of methallyl phosphonic acid, bis dipropylene glycol ester of 2-hydroxyethane phosphonic acid, the hexol phosphonate which is isomeric with the phosphite ester of 1,1,3 tris (p-2-hydroxypropoxyphenyl) propane (the ester having 6 free hydroxyl groups), the tetrol phosphonate isomeric with dipropylene glycol tetrol phosphite, the pentol phosphonate isomeric with dipropylene glycol pentol triphosphite, the hexol phosphonate isomeric with dipropylene glycol hexol tetraphosphite, the tetrol phosphonate isomeric with tripropylene glycol tetrol disphosphite, the tetrol phosphonate isomeric with polypropylene glycol 425 tetrol diphosphite, the hexol phosphonate isomeric with polypropylene glycol 2025 hexol tetraphosphite, the tetrol phosphonate isomeric with diethylene glycol tetrol diphosphite, the tetrol phosphonate isomeric with polyethylene glycol 1000 tetrol diphosphite, the hexol phosphonate isomeric with tris (propylene oxide-1,2,6-hexanetriol adduct) phosphite (the adduct having a molecular weight of 750, i.e., tris LHT 240 phosphite). The hexol phosphonate isomeric with similar tris esters of phosphorous acid with propylene oxide-1,2,6-hexanetriol adducts having molecular weights of 1500, 2400 and 4000 (tris LHT 112 phosphite, tris LHT 67 phosphite and tris LHT 42 phosphite respectively), the hexol phosphonates isomeric with tris (propylene oxide-glycerine adduct) phosphites where the adducts have molecular weights of 1000 (tris LG–168 phosphite) and 3000 (tris LG–56 phosphite), the hexol phosphonate isomeric with tris (sorbitol-propylene oxide adduct molecular weight 1000) phosphite, the hexol phosphonate isomeric with tris (trimethylolpropane propylene oxide adduct molecular weight 1700) phosphite, the hexol phosphonate isomeric with tris (ethylene oxide-glycerine adduct molecular weight 1000) phosphite, the polyol phosphonate isomeric with tris (pentaerythritol-propylene oxide adduct molecular weight 1000) phosphite as well as the phosphonates isomeric with the corresponding tris pentaerythritol-propylene oxide adducts of molecular weights 400, 450, 500, 600 and 2000, the polyol phosphonates isomeric with tris (trimethylol propane-propylene oxide adduct) phosphites of molecular weights 300, 400, 700, 1500, 2500 and 4000, the triol phosphonates isomeric with the tris (ethylene oxide-propylene oxide adduct) phosphites wherein the adducts are those of Example 1 and Example 2, runs 1, 3 and 8 of Lundsted Patent 2,674,619, the nonol phosphonate isomeric with LHT 240 nonoldiphosphite, the dodeca-ol phosphonate isomeric with LHT 240 dodeca-ol triphosphite, the polyol phosphonate isomeric with the diphosphite of pentaerythritol propylene oxide adduct having a molecular weight of 500 and the triol phosphonate isomeric with the tris 2,2-[p-(2-hydroxypropoxy) phenyl] propane ester of phosphorous acid. The phosphonates above which are set forth as isomeric with phosphites can be made by the Arbuzov rearrangement of the corresponding phosphite, e.g., with catalytic amounts of an alkyl halide, e.g., 5% of butyl bromide. Any of the phosphites set forth above can be converted to polyol phosphonates having one less polyol group by reacting with an excess of an alkyl halide to attach the alkyl group directly to the phosphorous atom.

The hydroxyl containing phosphonates, as previously indicated, can be converted to polyurethanes in the manner taught in parent application 145,749 of October 17, 1961.

Unless otherwise indicated, all parts and percentages are by weight.

*Example 1*

Dipropylene glycol hydroxypropoxypropane phosphonate (i.e., the bis dipropylene glycol ester of hydroxypropoxypropane phosphonic acid) was prepared by treating tris dipropylene glycol phosphite with 5 mol percent of n-butyl bromide at 125–135° C. for 8 hours at which time there was no increase in P=O bond in the infrared analysis. Volatile material was stripped off at 150° C. and 10 mm. The liquid residue was essentially pure bis dipropylene glycol hydroxypropoxypropane phosphonate contaminated with about 5% of dipropylene glycol butane phosphonate. The bis dipropylene glycol phosphonate had the formula

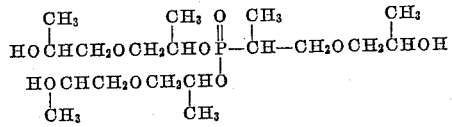

The compound of Example 1 is one of the preferred embodiments of the invention.

*Example 2*

1 mole of bis dipropylene glycol hydrogen phosphite was reacted with 1 mole of propylene oxide in the presence of 5 grams of potassium carbonate at 75° C. to produce bis dipropylene glycol 2-hydroxypropane phosphonate. Similar reactions can be carried out with ethylene oxide or butylene oxide and utilizing other alkaline catalysts, e.g., slaked lime, tetramethyl guanidine and pentamethyl guanidine.

Thus when the propylene oxide was replaced by 1 mole of ethylene oxide in Example 2 the product was bis dipropylene glycol 2-hydroxyethane phosphonate. Similarly when using 1 mole of bis diethylene glycol hydrogen phosphite and 1 mole of ethylene oxide in Example 2 in place of the bis dipropylene glycol hydrogen phosphite and propylene oxide there was obtained bis diethylene glycol 2-hydroxyethane phosphonate.

*Example 3*

1 mole of tris dipropylene glycol phosphite was heated with five moles of propylene chlorhydrin (1-chloro-2-hydroxypropane) for 8 hours at 125–135° C. The excess propylene chlorhydrin and the chloropropyl hydroxy propyl ether formed were stripped off in a vacuum (10 mm.) and bis dipropylene glycol 2-hydroxypropane-phosphonate recovered as the residue.

Bis dipropylene glycol hydroxyethane phosphonate can be obtained by substituting ethylene chlorohydrin for propylene chlorohydrin in this reaction. Propylene bromohydrin can be employed in place of propylene chlorohydrin. If the amount of propylene chlorohydrin is reduced, e.g., to a 1 to 1 mole ratio with the tris (dipropylene glycol) phosphite then there is obtained a mixture of bis dipropylene glycol 2-hydroxy propane phosphonate and bis dipropylene glycol hydroxypropoxypropane phosphonate as the product.

*Example 4*

The reaction set forth in Example 2 can also be carried out with the polymeric dipropylene glycol hydrogen phosphites. Thus one mole of trimeric dipropylene glycol hydrogen phosphite can be reacted with 3 moles of propylene oxide in the presence of 5 grams of tetramethyl guanidine to produce the corresponding hydroxypropane phosphonate according to the equation

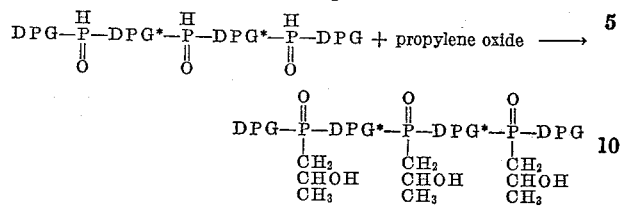

where DPG is dipropylene glycol with a hydroxyl hydrogen removed and DPG* is dipropylene glycol with both hydroxyl hydrogens removed. The starting phosphite can be prepared by heating bis dipropylene glycol hydrogen phosphite in a vacuum and distilling off the requisite amount of dipropylene glycol formed.

In place of propylene oxide there can be used ethylene oxide and butylene oxide, thus in Example 4 if the propylene oxide is replaced by 3 moles of ethylene oxide the product has the formula

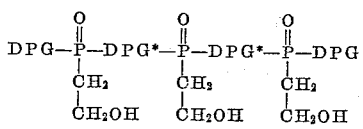

and if the propylene oxide is replaced by 3 moles of butylene oxide the product has the formula

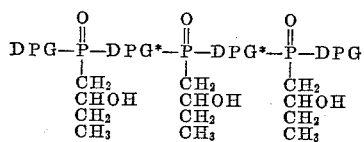

If an excess of alkylene oxide, e.g. 6 moles, is used in Examples 2 and 4 then further etherification of any of the free hydroxyl groups will occur. This reduces the percent of phosphorus in the molecule and hence is less preferable for some uses.

*Example 5*

Example 1 was repeated replacing the tris dipropylene glycol phosphite by 1 mole of tris tripropylene glycol phosphite to produce bis tripropylene glycol 2-hydroxypropoxypropoxy propane phosphonate. In similar fashion by replacing the tris dipropylene glycol phosphite in Example 1 with 1 mole of tris LHT 240 phosphite there was obtained the rearrangement of the phosphite to the corresponding phosphonate.

*Example 6*

1 mole of tris dipropylene glycol phosphite was treated with 1 mole of 1,4-dichlorobutene-2 at 90–100° C. After the exotherm was over the mixture was stripped of volatiles at 120° C. at 10 mm.; cooled to 100° C. and treated with an additional mole of tris dipropylene glycol. When the reaction was over (no heat rise was observed) the mixture was stripped of volatiles. The volatile products were essentially propylene chlorohydrin. The reaction product was essentially tetradipropylene glycol 1,4-butene-2-diphosphonate, an amber somewhat viscous oil having the formula:

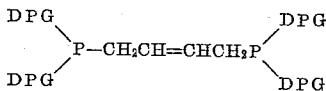

This product was reacted with 1 equivalent of bromine to obtain the corresponding 2,3-dibromide.

*Example 7*

Dipropylene glycol tetrol diphosphite was treated with 2.5 mole percent of butyl bromide until phosphonate formation appeared to be complete (8 hours at 125–135° C.). Volatiles were stripped out at 10 mm. pressure. The light colored viscous liquid was a mixture of

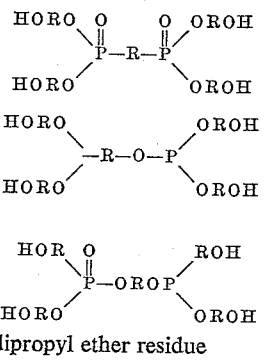

and

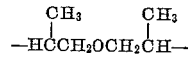

where R is the dipropyl ether residue $$-\mathrm{H\overset{CH_3}{\underset{|}{C}}CH_2OCH_2\overset{CH_3}{\underset{|}{C}}H}-$$

In a similar fashion tripropylene glycol tetrol diphosphite is treated with butyl bromide to give an analogous product.

The products of Examples 1–7 as previously stated can be reacted with organic polyisocyanates to form polyurethanes. To reduce the hydrophylic properties it has been found that it is preferable to have hydroxypropyl or hydroxypropoxy propyl groups present rather than hydroxyethyl or hydroxyethoxyethyl groups.

To form polyurethanes in addition to the novel phosphonates of Examples 1–7 there can also be used hydroxyalkyl and hydroxyalkoxyalkyl esters of hydrocarbon and halohydrocarbon phosphonates such as the bis propylene glycol ester of decanephosphonic acid, bis dipropylene glycol ester of decanephosphonic acid, bis dipropylene glycol ester of methanephosphonic acid, bis dipropylene glycol ester of cyclohexane phosphonic acid, bis propylene glycol ester of methanephosphonic acid, bis propylene glycol ester of cyclohexanephosphonic acid, bis propylene glycol ester of phenylphosphonic acid, bis dipropylene glycol ester of phenylphosphonic acid, bis dipropylene glycol ester of 4-chlorophenylphosphonic acid, tetra 2′-hydroxypropyl ethane-1,2-diphosphonate and tetra 2′-hydroxypropoxyethane-1,2-diphosphonate.

These latter phosphonate compounds can be formed in the manner described in Examples 1–7. Thus the bis dipropylene glycol ester of decanephosphonic acid can be made by employing 1 mole of tris dipropylene glycol and 5 moles of decyl bromide in the procedure of Example 3. The bis dipropylene glycol ester of methane phosphonic acid is made in similar fashion replacing the 5 moles of decyl bromide by 5 moles of methyl bromide. Similarly the bis dipropylene glycol ester of cyclohexane phosphonic acid is made by replacing the decyl bromide by 5 moles of cyclohexyl bromide. The ester of aromatic phosphonic acids can be prepared by procedure XV in Kosolapoff "Organo Phosphorus Compounds," page 139 or by procedure III on pages 128–129 of the same book.

Polyurethanes can be formed from polyisocyanates and the phosphonates of the present invention in the manner more fully disclosed in parent application 145,749 filed October 17, 1961.

*Example 8*

Dipropylene glycol pentol triphosphite was treated with 2.5 mole percent of butyl bromide at 125–135° C. until phosphonate formation is complete. Volatiles were stripped off at 10 mm. pressure. The product (residue) was a dipropylene glycol pentol triphosphonate isomeric with the starting phosphite. In similar fashion polypropylene glycol 425 tetrol diphosphite can be isomerized to the corresponding phosphonate with the aid of 2.5 mol percent of butyl bromide.

*Example 9*

Tris polypropylene glycol 425 phosphite was heated with 5 mol percent of n-butyl bromide at 125–135° C. until no increase in P=O bond was observed in infrared analysis. Volatile material was stripped off at 150° C. and 10 mm. The liquid residue was essentially bis polypropylene glycol 425 hydroxypolyproxy propane phosphonate where in the hydroxypolypropoxypropane group had a molecular weight of 425. In similar manner using the procedure of Example 9 tris LG–168 phosphite can be isomerized with 5 mol percent of n-butyl bromide to the corresponding hexol phosphonate having a molecular weight of about 3000. Correspondingly a hexol phosphonate having a molecular weight of 2100 is obtained by isomerizing tris LHT 240 phosphite in Example 9. Likewise employing the procedure of Example 9 tris pentaerythritol-propylene oxide adduct phosphite (adduct molecular weight 450) can be isomerized to the corresponding nonol phosphonate molecular weight about 1230. Also using the procedure of Example 9 the ester of 3 mols of 1,1,3 tris p-(2-hydroxypropoxy)phenyl propane with 1 mol of phosphorous acid (as prepared in the parent application) can be isomerized to the corresponding hexol phosphonate. These phosphonates are useful for preparing dyeable, rigid polyurethane foams.

Unsaturated phosphonates can be formed by reacting an excess of allyl chloride, methallyl chloride, allyl bromide, or methallyl bromide with tris-diethylene gycol phosphite or tris dipropylene glycol phosphite. These compounds are useful in preparing urethanes having the uses enumerated supra.

*Example 10*

One mole of tris diethylene glycol phosphite was refluxed with 6 moles of allyl chloride until there was no increase in P=O bond in the infrared analysis. Volatile material was stripped off first at atmospheric pressure up to 100° C. and then at 10 mm. and 150° C. to recover the bis diethylene glycol allylphosphonate, molecular weight 298, hydroxyl number 375, as a liquid.

*Example 11*

The process of Example 10 was repeated replacing the tris diethylene glycol phosphite by one mole of tris dipropylene glycol phosphite to produce bis-dipropylene glycol allylphosphonate, molecular weight 312, and hydroxyl number 360, as a liquid.

*Example 12*

The process of Example 10 was repeated replacing the allyl chloride by 6 moles of methallyl chloride to produce bis-diethylene glycol methallylphosphonate, molecular weight 354, hydroxyl number 316, as a liquid.

*Example 13*

The process of Example 12 was repeated but the tris diethylene glycol phosphite was replaced by one mole of tris dipropylene glycol phosphite to produce bis-dipropylene glycol methallylphosphonate, a viscous liquid having a molecular weight of 368 and a hydroxyl number of 305.

The compounds prepared in Examples 10–13 have the formula

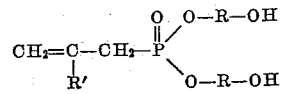

where R' is H or methyl and R is —CH$_2$CH$_2$OCH$_2$CH$_2$— or

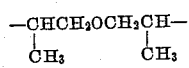

The diolalkene phosphonates thus produced can be polymerized, e.g., with free radical producing agents such as benzoyl peroxide, or reacted with di or other polycarboxylic acids to give air-drying polyesters. Alternatively, they can be reacted with polyisocyanates, e.g., toluene diisocyanate, to give polyurethanes which can be further polymerized by virtue of the ethylenic double bond to give products useful as coatings, castings, etc. The products are either self-extinguishing or nonburning. The diolalkenephosphonates can be copolymerized with other materials having ethylenic unsaturation, e.g., acrylates such as methyl acrylate, butyl acrylate and methyl methacrylate, styrene, acrylonitrile, ethylene and propylene. They can also be used as cross-linking agents. Additionally, the polymers produced can have enhanced dyeing properties because of the polarity introduced.

According to the present invention, there can be made numerous compounds having the formula

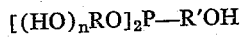

where $n$ is an integer, usually between 1 and 6, and R is aliphatic hydrocarbon or hydrocarbon ether and R' is hydrocarbon. Further examples of such compounds are given below. These compounds have all the uses of the hydroxy containing phosphites and phosphonates previously set forth.

*Example 14*

300 grams (0.95 mole) of bis dipropylene glycol hydrogen phosphite and 5 grams of triethylamine (catalyst) were treated with cooling and 44 grams (1 mole) of acetaldehyde. The reaction was exothermic. When reaction appeared to be complete, the mixture was heated on a steam bath for one hour and then stripped in vacuum at 100° C. to remove catalyst and excess acetaldehyde. To help facilitate removal of these components, nitrogen sparging was also used. There was recovered bis dipropylene glycol α-hydroxyethane phosphonate as a liquid, molecular weight 358, and hydroxyl number 462. Other tertiary amines and basic catalysts can be used.

There can be used an anion exchange resin as the catalyst. Thus, quaternary ammonium ion exchange resins of the Dowex and Amberlite type (quaternarized aminomethyl styrene-divinyl benzene copolymers) can be used.

*Example 15*

430 grams of tris dipropylene glycol phosphite (1.0 mole) and 0.2 ml. of concentrated hydrochloric acid were treated with 18.0 grams of water to produce the bis dipropylene glycol hydrogen phosphite by hydrolysis. Excess strongly basic Amberlite IR–410 ion exchange resin was then added followed by 50 grams (an excess) of acetaldehyde. When the reaction appeared to be complete, the mixture was heated for one hour at 100° C. The catalyst was filtered off, the filtrate stripped in high vacuo, with a nitrogen gas stream to help remove dipropylene glycol. The product was identical with that in Example 14.

*Example 16*

Tris dipropylene glycol dihydrogen diphosphite (prepared by acid hydrolysis of dipropylene glycol tetrol diphosphite in a manner similar to that described in Example 15 for bis dipropylene glycol hydrogen phosphite or by the self-condensation of bis dipropylene glycol hydrogen phosphite) in an amount of 225 grams (0.5 mole) and 10 grams of Amberlite IR–410 were treated as in Example 15 with 44 grams (1 mole) of acetaldehyde. The reaction was exothermic and rapid. The mixture was heated to 100° C., maintained at 100° C. for one hour, the catalyst removed by filtration and the filtrate stripped under vacuum to remove volatiles. The liquid product was tris dipropylene glycol bis (α-hydroxy ethane) phosphonate.

*Example 17*

In a manner similar to Example 15 there was reacted 30 grams of formaldehyde generated by the decomposition of trioxane with bis dipropylene glycol hydrogen phosphite to give bis dipropylene glycol hydroxymethane phosphonate, molecular weight 344, hydroxyl number 480.

In similar fashion, tris dipropylene glycol bis hydroxymethane diphosphonate was prepared from formaldehyde and tris dipropylene glycol dihydrogen diphosphite. The product was a liquid.

Example 18

One mole of bis dipropylene glycol hydrogen phosphite was reacted with 1 mole of propylene oxide in the presence of 2 grams of triethylamine at 75° C. After removing the catalyst by heating in vacuo at 100° C., the product that remained was essentially pure bis dipropylene glycol hydroxypropane phosphonate.

Example 19

One mole of bis dipropylene glycol hydrogen phosphite was treated with 5 moles (i.e., an excess) of propylene oxide in the presence of 2 grams of triethylamine at 75° C. After 4 hours, the catalyst and excess propylene oxide were removed. The residue weighed 513 grams, had 4 propylene oxide units condensed with the bis dipropylene glycol phosphite and appeared to be a propylene oxide condensation product with bis dipropylene glycol hydroxypropane phosphonate.

Example 20

One mole of bis dipropylene glycol hydrogen phosphite was reacted with 1 mole of ethylene oxide in the presence of 5 grams of potassium carbonate at 75° C. to produce bis dipropylene glycol hydroxyethane phosphonate. Reaction of this product with further quantities of ethylene oxide, e.g., 4 moles of ethylene oxide, gave polyoxyethylene condensation products of bis dipropylene glycol hydroxyethane phosphonate.

Example 21

Tris dipropylene glycol phosphite was rearranged to bis dipropylene glycol hydroxypropoxy phosphonate in the same manner as in Example 1.

This product was heated with 6 moles of propylene oxide in the presence of 5 grams of potassium carbonate to give a mixture of polyoxypropylated phosphonate compounds identified as bis polypropylene glycol polypropylene glycol phosphonates.

By utilizing ethylene oxide in place of propylene oxide, the corresponding bis polypropylene glycol polyethylene glycol phosphonates were obtained.

Alternatively, mixtures of ethylene oxide and propylene oxide can be reacted with bis dipropylene glycol hydroxypropoxypropane phosphonate to give a randomly mixed polyoxyalkyl phosphonate, or ethylene oxide can be followed by propylene oxide or vice versa to give a block type of polymer. Other alkylene or hydroxyalkylene oxides can be used alone or in conjunction with ethylene oxide and/or propylene oxide in this condensation polymerization on a phosphonate base.

In a specific example, a mixture of 2 moles of ethylene oxide with 3 moles of propylene oxide was reacted with bis dipropylene glycol hydroxypropoxypropane phosphonate in the presence of 3 grams of triethylamine at 75° C.

Similarly, bis diethylene glycol hydrogen phosphite can be reacted with propylene oxide, ethylene oxide, butylene oxide or mixtures of these oxides to give a random mixture of polyoxyalkyl phosphonates. Alternatively, units of propylene oxide followed by ethylene oxide can be used to give block type polymers of polyoxyalkyl prosphonates.

Example 22

One mole of phosphorous acid was treated with a mixture of 2.15 moles of ethylene oxide and 2.15 moles of propylene oxide at 75–85° C. When the reaction was complete, the excess alkylene oxides were removed in vacuo at 85° C. The residual liquid was a random mixture of hydroxyethoxyethyl hydrogen phosphite, hydroxyethoxypropyl hydrogen phosphite, hydroxypropoxypropyl hydrogen phosphite and hydroxypropoxyethyl hydrogen phosphite. On the average, the number of oxyethylene units equalled the number of oxypropylene units.

This product was treated with 1 mole of propylene oxide in the presence of 2 grams of triethylamine at 75° C. After removing the catalyst by heating at 100° C. in a vacuum, the product that remained was a mixture of hydroxyethoxyethyl, hydroxyethoxypropyl, hydroxypropoxypropyl and hydroxypropoxyethyl hydroxypropane phosphonates.

By substituting 1 mole of ethylene oxide for the 1 mole of propylene oxide in this latter reaction, there was obtained the corresponding hydroxyethane phosphonates.

By substituting a mixture of 2 moles of ethylene oxide and 2 moles of propylene oxide for the 1 mole of propylene oxide in this example there was obtained a random polyoxyethyl - polyoxypropyl phosphonate. Block type polymers can be formed for utilizing the ethylene oxide prior to the propylene oxide or vice versa.

Example 23

900 grams (3 moles) of Pluracol TP–340 Triol (a polyether triol prepared from trimethylolpropane and propylene oxide), 310 grams (1 mole) of triphenyl phosphite and 2 grams of diphenyl phosphite were reacted otgether at 130–140° C. under reduced pressure. Phenol was distilled off at 85–90° C. at 10 to 12 mm. Toward the end of the reaction the temperature was raised to 175° C. and nitrogen was passed through the mixture to help complete the removal of phenol. A total of 280 grams of phenol was collected (100% yield). The residue was essentially pure tris (Pluracol TP-340) phosphite, a hexol phosphite. This was rearranged to the corresponding phosphonate by heating with about 5 mole percent of butyl bromide for 7 hours at 135° C.

Example 24

3 moles of Pluracol TP–440 Triol (a polyether triol prepared from trimethylolpropane and propylene oxide, molecular weight about 440) was used in place of the Pluracol TP–340 Triol in Example 23 to form tris (Pluracol TP–440) phosphite and the corresponding phosphonate.

By varying the amount of Pluracol TP Triol with respect to the triphenyl phosphite, it is possible to form hexol monophosphites and polymeric phosphites similar to those obtained from dipropylene glycol and triphenyl phosphite (Friedman U.S. patent application Serial No. 129,529, filed August 7, 1961, shows such polymeric phosphites). Thus, from 3 moles of Pluracol TP–340 Triol and 1 mole of triphenyl phosphite utilizing the reaction conditions of Example 23, there was obtained a hexol monophosphite and the corresponding monophosphonate. When 9 moles of Pluracol TP–340 Triol and 4 moles of triphenyl phosphite are used in Example 23 pentadecol tetraphosphite is first obtained which, in the next step, is rearranged to the corresponding phosphonate.

Mixed polyol phosphites and phosphonates can be prepared by initially transesterifying mixtures of polyols with triphenyl phosphite.

Example 25

Pluracol PeP 450 tetrol (a polyoxypropylene adduct of pentaerythritol, molecular weight about 450) in an amount of 3 moles was converted to tris (Pluracol PeP 450 tetrol) phosphite by reacting with 1 mole of triphenyl phosphite in the presence of 5 grams of diphenyl phosphite and heating to 150° C. in vacuo. 3 moles of phenol were stripped off. The tris (pentaerythritol-propylene oxide adduct) phosphite thus formed was rearranged to the corresponding phosphonate by treatment with 5 mole percent of butyl bromide at 135° C. for 8 hours.

By utilizing Pluracol PeP 550 tetraol (a polyoxypropylene adduct of pentaerythritol, molecular weight about 550) in place of Pluracol PeP 450 in Example 25 there is obtained first tris (Pluracol PeP 550 tetrol) phosphite and then the corresponding phosphonate.

By varying the mole ratios of tetrol to triphenyl phosphite, e.g., using 7 moles of the tetrol to 3 moles of the triphenyl phosphite, more highly condensed phosphites and phosphonates can be prepared.

*Example 26*

Pluracol L31 (a polyoxyalkylene block polymer diol containing about 10% polyoxyethylene and 90% polyoxypropylene residue and having a molecular weight of 950) in an amount of 3 moles (2850 grams) was transesterified with 1 mole (310 grams) of triphenyl phosphite in the presence of 5 grams of diphenyl phosphite catalyst in the manner described in Example 23 to give tris (Pluracol L31) phosphite, a triol. This was rearranged into the corresponding phosphonate with a catalytic amount of alkyl halide, specifically by heating with 5 mole percent of butyl bromide at 135° C. for 8 hours.

The Pluronic series to which L31 belongs is characterized by having primary terminal hydroxyl groups as a consequence of having the ends of the polymer chain terminated with polyoxyethylene units. In the examples of the present application where the only units are polyoxypropylene units the terminal hydroxyl groups are mainly secondary hydroxyl groups.

*Example 27*

Hyprin GP 25 is essentially a mixture of tris 1,2,3-hydroxypropoxypropane and bis (hydroxypropoxy) hydroxypropane. The hydroxyl groups are essentially all secondary. 3 moles of Hyprin GP 25 was transesterified with 1 mole of triphenyl phosphite in the presence of 5 grams of diphenyl phosphite in the manner described in Example 23 to give tris (Hyprin GP 25) phosphite, a hexol. This compound was rearranged with 5 mole percent of butyl bromide as a catalyst to give the corresponding phosphonate.

High phosphite condensation polymers can be obtained by varying the proportions of Hyprin GP 25 to triphenyl phosphite.

*Example 28*

Hyprose SP 80 [octakis (2-hydroxypropyl) sucrose with an average molecular weight of 800] in an amount of 3 moles (2400 grams) was reacted with 1 mole (310 grams) of triphenyl phosphite in the presence of 5 grams of diphenyl phosphite at 135° C. under reduced pressure. The phenol formed was distilled off in vacuo. The liquid residue was tris (Hyprose SP 80) phosphite which contained 21 free hydroxyl groups. This compound was rearranged to the corresponding phosphonate by heating at 135° C. for 8 hours in the presence of 5 mole percent of butyl bromide.

The phosphite and phosphonate prepared in Example 28 are both useful for reaction with isocyanates, e.g., with a slight excess (on an equivalence basis) of toluene diisocyanate, to give flame-resistant polyurethane foams. The Hyprose SP 80 phosphates and phosphonates can be used alone to give rigid polyurethane foams or in admixture with other polyols to give rigid or flexible foams.

Condensed phosphites and phosphonates can be prepared by varying the mole ratio of Hyprose SP 80 to triphenyl phosphite.

What is claimed is:

1. A member of the group consisting of (1) a phosphonate having the formula $$R_1 P \begin{matrix} O \\ \| \end{matrix} \begin{matrix} OR_2 \\ OR_2 \end{matrix}$$

where $R_1$ is selected from the group consisting of hydroxy lower alkyl, hydroxy lower alkoxy lower alkyl and hydroxy poly lower alkoxy lower alkyl and $R_2$ is selected from the group consisting of hydroxy lower alkyl, hydroxy lower alkoxy lower alkyl and hydroxy poly lower alkoxy lower alkyl and (2) polymers of said phosphonates.

2. Bis poly lower alkylene glycol 2-hydroxy lower alkane phosphonate.

3. Bis polypropylene glycol 2-hydroxy lower alkane phosphonate.

4. Bis poly lower alkylene glycol 2-hydroxy lower alkyl lower alkane phosphonate.

5. Bis polypropylene glycol 2-hydroxyalkoxy lower alkane phosphonate.

6. Bis dipropylene glycol 2-hydroxypropoxypropane phosphonate.

7. Bis polyalkylene glycol 2-hydroxypolyalkoxyalkane phosphonate wherein the alkane and alkoxy groups have 2 to 4 carbon atoms.

8. Bis polypropylene glycol 2-hydroxypoly lower alkoxy lower alkane phosphonate.

9. Bis polypropylene glycol 2 - hydroxy-polypropoxy propane phosphonate.

10. A reaction product which is a phosphonate formed by Arbuzov rearrangement with the aid of heat of a phosphite having the formula $$\begin{matrix} R_1O \\ \\ R_2O \end{matrix} P-(OR_3OP)_nOR_4OP \begin{matrix} OR_7 \\ \\ OR_6 \end{matrix} \begin{matrix} OR_5 \\ \\ OR_6 \end{matrix}$$

where $R_1$, $R_2$, $R_5$ and $R_6$ and $R_7$ are the residues of a poly lower alkylene glycol from which one of the hydroxyl groups has been removed, $R_3$ and $R_4$ are the residues of a poly lower alkylene glycol from which the two hydroxyl groups have been removed and $n$ is selected from the group consisting of zero and an integer.

11. A phosphonate according to claim 10 wherein all of the R groups are residues of polypropylene glycol.

12. A phosphonate according to claim 11 wherein all of the R groups are residues of dipropylene glycol.

13. Bis poly lower alkylene glycol α-hydroxy lower alkane phosphonate.

14. Bis propylene glycol α-hydroxy lower alkane phosphonate.

15. A phosphonate of an aromatic hydrocarbon ether polyol, said aromatic ether polyol being the ether of a hydroxy aromatic hydrocarbon having 2 to 3 phenolic groups with a member of the group consisting of lower alkylene glycols and poly lower alkylene glycols, said phosphonate having 3 to 6 hydroxyl groups.

16. A phosphonate according to claim 15 wherein said member is polypropylene glycol.

17. A phosphonate having the formula $$\begin{matrix} R_2O \\ \\ R_2O \end{matrix} \begin{matrix} O \\ \| \\ P-R_1-P \end{matrix} \begin{matrix} O \\ \| \\ \end{matrix} \begin{matrix} OR_2 \\ \\ OR_2 \end{matrix}$$

where $R_1$ is selected from the group consisting of bivalent lower alkane, dihalo lower alkane and lower alkene radicals and $R_2$ is selected from the group consisting of hydroxy lower alkyl, hydroxy lower alkoxy lower alkyl, hydroxy poly lower alkoxy lower alkyl, lower alkoxy lower alkyl, lower alkoxy lower alkoxy lower alkyl and lower alkoxy lower polyalkoxy lower alkyl.

18. Bis dipropylene glycol hydroxy-propoxypropane phosphonate.

19. Bis poly lower alkylene glycol hydroxy lower alkoxy lower alkane phosphonate.

20. Dipropylene glycol tetrol diphosphonate.

21. Dipropylene glycol pentol triphosphonate.

22. Poly lower alkylene glycol polyol polyphosphonate, said phosphonate having 4 to 6 hydroxyl groups and 2 to 4 phosphorus atoms.

23. Polypropylene glycol polyol phosphonate, said phosphonate having 4 to 6 hydroxyl groups and having two less phosphorus atoms than the number of hydroxyl groups.

24. Dipropylene glycol polyol phosphonate, said phosphonate having 4 to 6 hydroxy groups and having two less phosphorus atoms than the number of hydroxyl groups.

25. Bis di lower alkylene glycol hydroxy lower alkoxy lower alkane phosphonate.

26. Bis diethylene glycol hydroxyethoxyethane phosphonate.

27. Bis dipropylene glycol hydroxymethane phosphonate.

28. Bis dipropylene glycol α-hydroxyethane phosphonate.

29. Tris poly lower alkylene glycol bis α-hydroxy lower alkane diphosphonate.

30. Tris dipropylene glycol bis hydroxymethane diphosphonate.

31. Tris dipropylene glycol bis α-hydroxyethane diphosphonate.

32. Tris dipropylene glycol α-hydroxy lower alkane diphosphonate.

References Cited in the file of this patent

UNITED STATES PATENTS

| | | |
|---|---|---|
| 2,683,168 | Jensen et al. | July 6, 1954 |
| 2,693,482 | Stayner | Nov. 2, 1954 |
| 2,795,609 | Jensen et al. | June 11, 1957 |